United States Patent Office 3,751,471
Patented Aug. 7, 1973

---

3,751,471
N-HYDROXYBENZYL-α,α'-XYLENE-DIAMINES
Wilhelm Becker, Hamburg, Germany, assignor to Reichhold-Albert-Chemie Aktiengesellschaft, Hamburg, Germany
No Drawing. Filed June 12, 1970, Ser. No. 45,898
Claims priority, application Switzerland, June 19, 1969, 9,601/69
Int. Cl. C07c 87/28
U.S. Cl. 260—570.5 P          3 Claims

ABSTRACT OF THE DISCLOSURE

The invention relates to improved phenols and to their use as cross-linking agents for epoxy compounds. Hitherto known cross-linking agents of this type are, however, highly viscous and must be diluted prior to use and this causes some deterioration of the properties of the plastic produced. Furthermore, some of the coatings made with these cross-linking agents are attacked by acids and form a white layer when wetted with water. In addition, their mechanical properties are not satisfactory. The invention has the object of eliminating the above mentioned defects of coatings or compounds of epoxy resins, by reacting special diamines, first with aldehydes, and then with a C—H acid compound.

DESCRIPTION

It is known to activate diamines, used as cross-linking agents for epoxy compounds, such as, e.g., ethylene diamine, diethylene triamine, triethylene tetramine, tetraethylene pentamine or cycloaliphatic diamines by common condensation with phenols and aldehydes, or by precondensation of phenol and aldehyde and following reaction of this reaction product with the diamine, e.g., with 3,3,5-trimethyl-5-aminomethyl cyclohexylamine. Although these condensation products offer some improvements, compared with the simple activation of polyamines by adding phenols, they do not yet meet all requirements. Many of these cross-linking agents are highly viscous and must be diluted with softeners prior to their use with epoxy resins, and this causes automatically a deterioration of the properties of the plastics substances produced in this manner.

In addition, the coatings, produced with these known cross-linking agents with epoxy resins on a bisphenol A base are very sensitive to attack by organic acids or form white layers when wetted with water. Furthermore, the mechanical properties of the hardened epoxy resin compounds are not very satisfactory.

It is the object of the invention to eliminate the above cited disadvantages of coatings or compounds of epoxy resins, by reacting special diamines first with aldehydes and then with a C—H acid compound.

It is the object of the invention to provide:

(a) New substituted phenols with the general formula

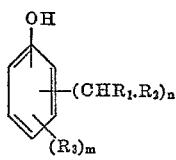

in which $R_1$ signifies:

H—, CH$_3$—, C$_2$H$_5$—, C$_3$H$_7$—, C$_4$H$_9$—, or 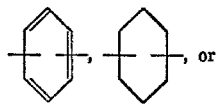, $R_2$ is

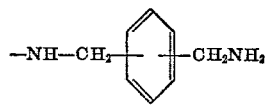

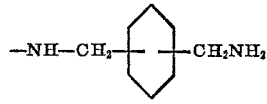

—NHCH$_2$.C(CH$_3$)$_2$.CH$_2$CH(CH$_3$).CH$_2$.CH$_2$.NH$_2$
and/or
—NH.CH$_2$.CH(CH$_3$).CH$_2$C(CH$_3$)$_2$.CH$_2$CH$_2$NH$_2$ $R_3$ is H—, CH$_3$, (CH$_3$)$_3$—C—, HO— or 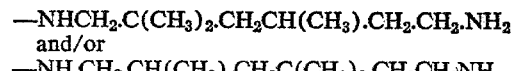, B is —CH$_2$—, —C(CH$_3$)$_2$— or —SO$_2$—,
$n$ is a number from 1 to 3 and
$m$ is a number from 1 to 3.

(b) A method for manufacturing substituted phenols with the general formula

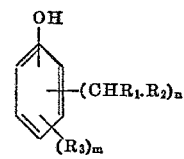

in which $R_1$ signifies:

H—, CH$_3$—, C$_2$H$_5$—, C$_3$H$_7$—, C$_4$H$_9$—, or 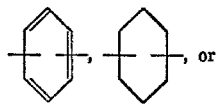, $R_2$ is

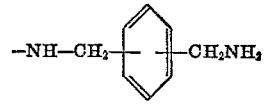

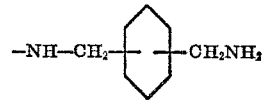

—NHCH$_2$.C(CH$_3$)$_2$.CH$_2$.CH(CH$_3$).CH$_2$.CH$_2$.NH$_2$
and/or
—NH.CH$_2$.CH(CH$_3$).CH$_2$C(CH$_3$)$_2$.CH$_2$.CH$_2$NH$_2$ $R_3$ is H—, CH$_3$, (CH$_3$)$_3$—C—, HO— or 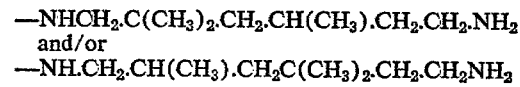, B is —CH$_2$, —C(CH$_3$)$_2$— or —SO$_2$—,
$n$ is a number from 1 to 3
$m$ is a number from 1 to 3, wherein amines with the formula
H$_2$N.CH$_2$—X—CH$_2$.NH$_2$,
in which X is

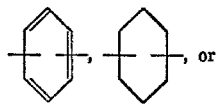, 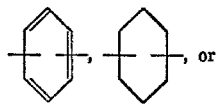, or

—C(CH$_3$)$_2$.CH$_2$.CH(CH$_3$).CH$_2$— and/or
—CH(CH$_3$).CH$_2$C.(CH$_3$)$_2$.CH$_2$— are reacted with aldehydes, having the general formula
RHCO, in which R is H—, CH$_3$—, C$_2$H$_5$—, C$_3$H$_7$—, C$_4$H$_9$ or

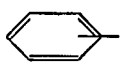

and then with phenols having the general formula

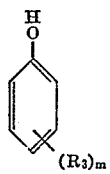

$R_3$ is —H—, $CH_3$, $(CH_3)C$—, HO— or

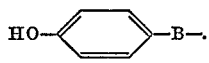

B is —$CH_2$—, —$C(CH_3)_2$— or —$SO_2$— and m is a whole number from 1 to 3, at temperatures between 20° C. and 150° C.

(c) The use of new substituted phenols according to the invention as cross-linking agents for the manufacture of molded bodies and coatings of epoxy compounds.

The amines used are diamines having the general formula $H_2N.CH_2$—X—$CH_2.NH_2$, in which X signifies the bivalent radicals

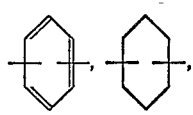

—$C(CH_3)_2.CH_2.CH(CH_3)CH_2$— and/or
—$CH(CH_3).CH_2.C(CH_3)_2.CH_2$—.

More particularly may be mentioned 1,2-, 1,3- and 1,4-bis(aminomethyl)benzene or mixture of the isomers, 1,2-, 1,3- or 1,4-bis(aminomethyl-)cyclohexane or mixtures of the isomers, 2,2,4- and 2,4,4-trimethyl hexamethylene diamine or a mixture of the isomers. Preferably, bis-(aminomethyl-)benzene or bis-(aminomethyl-)cyclohexane are used.

The aldehydes used may be both aromatic and aliphatic aldehydes, such as, for example, formaldehyde, acetaldehyde, butylaldehyde, benzaldehyde.

Preferably, aqueous formaldehyde solutions of 30–45 percent by weight are used, and more particularly polymeric polyoxymethylenes, known under the name of Paraform and containing 80–98% by weight formaldehyde. With the use of Paraform, the latter is used preferably in an aqueous, 10–90% by weight suspension or dispersion, or else the Paraform is added for condensation to a mixture of one or more diamines and water.

Monovalent and multivalent phenols with at least one aldehyde reactive nucleus as starting compound for the manufacture of the new substituted phenols are, for example, phenol, o-, m-, p-cresol, xylenols, resorcinol, pyrocatechol, hydrochinone, phloroglucinol, pyrogallic acid, p-tert.butylphenol, 4,4'-dihydroxy diphenylmethane, 4,4'-dihydroxy diphenyl ether, 4,4'-dihydroxy diphenylsulphone and others. Preferably, phenol is used.

The molar ratios of the individual constituents diamine, aldehyde and phenol may be varied within wide limits during the manufacture, in order to produce the desired properties in the condensation products.

The molar ratio of the components in the manufacture of the new substituted phenols between monovalent or multivalent phenol and diamine is 1:1 to 1:3, and preferably 1:1 to 1:1.2. The molar ratio between phenol and aldehyde is 1:1 to 1:3, and preferably 1:1 to 1:1.2, i.e., for example, in the manufacture of substituted phenols with the general formula

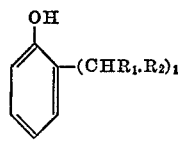

the starting constituents, i.e., diamine, aldehyde and phenol are used in the molar ratio of 1:1:1; in the manufacture of substituted phenols with the general formula

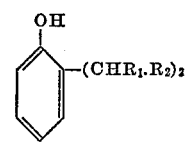

the starting constituents, diamine, aldehyde and phenol are used in the molar ratio of 1:2:2; and in the manufacture of subsituted phenols with the general formula

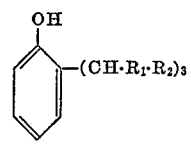

the starting constituents, diamine, aldehyde and phenol are used in the molar ratio of 1:3:3.

Where the new substituted phenols are intended for use as cross-linking agents or cross-linking components in the reaction of epoxy compounds for forming synthetic resins which are insoluble in organic media, it might be convenient to add free phenol or free phenols of the kind hereinbefore mentioned and/or free diamines and/or aldehyde, to the new substituted phenols.

Where the subsequent addition of phenols or diamines or aldehydes appears to be undesirable, the reaction mixture may be prepared with an excess of phenols and/or diamines and/or aldehydes. In such cases, the molar ratio between mono- or multivalent phenol and multivalent diamines may be 0.01:1 to 5:1, and preferably between 0.1:1 and 2:1, and the molar ratio between phenol or phenols and aldehyde from 1:0.1 to 1:3, and preferably between 1:0.5 and 1:1.2, wherein the unchanged portions serve as modifying additions to the reaction product for use as cross-linking agent.

The manufacture of the new substituted phenols is effected by the condensation of diamines, aldehydes and at least one monoreactive phenols, and by heating these mixtures to temperatures of, e.g., 80–150° C. After the termination of the condensation reaction, the water of reaction is distilled off, and the condensation products remain in the form of oily to resinous substances. Preferably, the process is such that the diamine or mixture of diamines is mixed in a reaction vessel, equipped with a thermometer and a stirrer, with the aldehyde at a temperature between 20 and 100° C., and preferably between 30 and 50° C. under agitation for a period of 15 to 150 minutes, possibly under cooling in the case of an exothermic reaction, and then within the same temperature ranges with the phenol.

After the mixing of the phenol, water is then removed from the reaction mixture under a vacuum of between 15 and 60 torr, by raising the temperature to up to 150° C. and preferably to 105° C.

After filtering and cooling, light to dark yellow condensation products are obtained which can be converted, in accordance with their "hydrogen equivalent," with epoxy resins to form synthetic resins which are insoluble in organic solvents. The said "hydrogen equivalent" results from the yield of substituted phenol, divided by the equivalent of hydrogen combined with nitrogen, present in the reaction mixture, less the amount consumed by the reaction with the aldehyde.

If the new substituted phenols are to be used as cross-linking agents for epoxy compounds, it might be convenient to mix them with other substituted phenols, produced in the same manner, or by means of other multivalent amines used in the condensation process instead of the special diamines. In order to avoid such a subsequent mixing process, the new substituted phenols may also be produced in the presence of other multivalent amines.

Suitable for mixing with the above mentioned diamines for manufacturing the new substituted phenols are, for example, saturated or unsaturated bifunctional amines, e.g., low aliphatic alkylene polyamines, such as, e.g., ethylene diamine, 1,2-propylene diamine, 1,3-propylene diamine, 1,4-butylene diamine, hexamethylene diamine or polyalkylene polyamines, e.g., homologous polyethylene polyamines, such as diethylene triamine, triethylene tetramine, tetraethylene pentamine or analogous polypropylene polyamines, as, e.g., dipropylene triamine or polyoxypropylene polyamine.

In addition thereto, other aliphatic, cycloaliphatic or araliphatic amines with at least two amine-hydrogen functions may be used for mixing for the reaction, such as, e.g., β,β-diamino-di-n-propylamine, 4,4'-diamino dicyclohexyl methane, hexahydrobenzyl aminopropylamine and/or 1,2-diamino cyclohexane.

The new substituted phenols or the said mixtures containing the same may be used as cross-linking agents for the production of molded bodies or coatings or epoxy compounds.

The following may be mentioned amongst the large number of epoxy compounds containing more than one 1,2-epoxy group in the molecule and suitable for the formation of molded bodies and coating with the substituted phenols according to the invention: The epoxides of multiple unsaturated hydrocarbons, such as vinyl cyclohexane, dicyclopentadiene, cyclohexadiene, cyclododecatriene, isoprene, 1,5-hexadiene, butadiene, polybutadiene, divinyl benzene, and the like, oligomers of epichlorohydrin and the like, epoxy ethers of multivalent alcohols, such as ethylene, propylene and butylene glycols, polyglycols, thiodiglycols, glycerine, pentaerythritol, sorbitol, polyvinyl alcohol, polyallyl alcohol and the like, epoxy ethers of multivalent phenols such as resorcinol,
hydrochinone,
bis-(4-hydroxyphenol)-methane,
bis-(4-hydroxy-3-methyl phenyl)-methane,
bis-(4-hydroxy-3,5-dichlorophenyl)-methane,
bis-(4-hydroxy-3,5-dibromophenyl)-methane,
bis-(4-hydroxyphenyl)-ethane,
2,2-bis-(4-hydroxyphenyl)-propane,
2,2-bis-(4-hydroxy-3-methylphenyl)-propane,
2,2-bis-(4-hydroxy-3-chlorophenyl)-propane,
2,2-bis-(4-hydroxy-3,5-dichlorophenyl)-propane,
bis-(4-hydroxyphenyl)-phenylmethane,
bis-(4-hydroxyphenyl)-diphenylmethane,
bis-(4-hydroxyphenyl)-4'-methylphenyl methane,
1,1-bis-(4-hydroxyphenyl)-2,2-trichloroethane,
bis-(4-hydroxyphenyl)-(4-chlorophenyl)-methane,
1,1-bis-(4-hydroxyphenyl)-cyclohexane,
bis-(4-hydroxyphenyl)-cyclohexylmethane,
4,4'-dihydroxydiphenyl,
2,2'-dihydroxydiphenyl,
4,4'-dihydroxydiphenyl-sulphone, and their hydroxy ethyl ethers, phenol-formaldehyde condensation products, such as phenol alcohols, phenol aldehyde resins, and the lipe, epoxides containing S and N (N,N-diglycidyl aniline, N,N'-dimethyl diglycidyl-4,4-diaminodiphenyl methane) and epoxides produced, in accordance with conventional methods, from multiple unsaturated carbonic acids or simple unsaturated carbonic acid esters of unsaturated alcohols, glycidyl esters, polyglycidyl esters, produced by polymerization or copolymerization from the glycidyl esters of unsaturated acids or other acid compounds, such as, e.g., cyanic acid, diglycidyl sulfide, cyclic trimethylene sulfon, or their derivatives and the like.

In the same manner as the above mentioned pure epoxides, also their mixtures may be used in the reaction, as well as mixtures of monoepoxides, possibly in the presence of solvents or softeners. Thus, for example, the following monoepoxides may be used in mixtures with the above mentioned epoxide compounds: simple unsaturated epoxy hydrocarbons (butylene, cyclohexene, styrene oxide and the like), epoxides containing halides, such as, e.g., epichlorohydrin, epoxy ethers of monovalent alcohols (methyl, ethyl, butyl, 2-ethylhexyl, dodecyl alcohol and others), epoxy ethers of monovalent phenols (phenol, cresol and other phenols substituted in the o- or p-positions), glycidyl esters of unsaturated carboxylic acids, epoxy esters of unsaturated alcohols or unsaturated carboxylic acids, as well as the acetals of glycidaldehyde.

It is also possible to add to the said epoxy compounds used for molded bodies or coatings, fillers, dyes, pigments, solvents and/or flexibilizers, such as phthalic esters of monoalcohols, e.g., n-butanol, amyl alcohol, 2-ethylhexanol, nonanol, benzyl alcohol, either singly or in mixtures, γ-butyrolactone, δ-valerolactone, ε-caprolactone, furfuryl alcohol, lower and higher molecular polyols, e.g., glycerine, trimethylolpropane, ethyl glycol and oxyethylated or oxypropylated polyols, as well as cross-linking accelerators; these agents are added prior to the cross-linking.

The application of the substituted phenols produced in accordance with the invention, may possibly be shortened in the manufacture of molded bodies or coatings by adding accelerating substances of the group comprising mono or multivalent phenols, and more particularly aminophenols, mono or multivalent alcohols, or by compounds such as epichlorohydrin, mercapto compounds, thio ether or compounds with nitrogen-carbon-sulphur groups or sulfoxide groups.

According to the invention, the cross-linking of the polyepoxy resins or epoxy compounds containing more than one epoxy group in the molecule with the substituted phenols obtained according to the invention may be carried out, according to the reactivity of the epoxy resins, at —5° C. up to room temperature and even at substantially higher temperatures.

Usually, the cross-linking is carried out within a temperature range from —5° C. to 150° C. Preferably, the new substituted phenols are used in quantities equivalent to the epoxy resin, but in many cases an excess of up to 50 mole-percent or a deficiency of up to 25 moles-percent of the substituted phenols is possible. It should here be stressed that cross-linking takes place with the new cross-linking agents even at low temperatures about 0° C. and, under certain conditions, even at —5° C. Hardening may also be carried out under conditions of high air moisture and in some cases even under water. By suitable choice and quantities of the components of the condensation products, that is to say, diamine, aldehyde and phenol, the reactivity, elasticity and resistance to chemicals may be adapted to the intended application.

Where the new cross-linking agents are used for the manufacture of coatings, they produce good flowing and pigmentation properties.

According to the invention, cross-linked epoxy resins are obtained which exhibit excellent resistance to water, acid and chemicals, good surface lustre and a very good elasticity. They are very suitable for making large volume castings, for example, for the tool construction. However, they may also be used as laminating resins, adhesives, putties, synthetic resin cements, as well as coating, lining and repair material for concrete floors and concrete pipes. Contrary to many conventional amino cross-linking agents, the above described new substituted phenols are compatible by themselves and in combination with epoxy resins with bitumen, asphalt and similar coal tar products. Such combinations with coal tar products may be used advantageously as protection of surfaces and against corrosion, in road building and in the building industry. The following may be mentioned, by way of example: casting and adhesive compounds, sealing and insulating materials. The molded bodies or coatings obtained may be provided, for example, with fillers, such as silicon dioxide, hydrated aluminum oxide, titanium dioxide, glass fiber, wood meal, mica, graphite, calcium silicate and/or sand, as well as the usually used pigments, for example in grain sizes from 0.5 to 5 mm.

The following data and examples will explain the manufacture of the new condensation products and their use as cross-linking agents for manufacturing molded bodies and coatings.

Example 1

136 grams (1 mole) of a mixture of 70% by weight 1,3- and 30% by weight 1,4-bis(aminomethyl)-benzene are heated to 40–50° C. in a reaction vessel equipped with thermometer, agitator and distillation device. 47.9 grams (0.7 mole) of a 44% by weight aqueous solution of formaldehyde are added during a period of 45 minutes within the said temperature range under strong stirring and occasional cooling to remove the reaction heat. Partly, a compact, whitish mass is formed. Stirring is continued at the same temperature for 15 to 45 minutes and then 94 grams (1 mole) of phenol, liquefied by heating, are added during about 15 minutes and stirring is continued for about 30 minutes. Next, water is distilled off at reduced pressure, e.g., at 15–20 mm. Hg and slow heating to 105° C. Reduced pressure is maintained for about 60 minutes, causing the whitish precipitate to be almost completely dissolved. After filtering and cooling, a reaction product is obtained, having a viscosity of 2760 cp. (25° C.), a density of 1.12 (25° C.), an equivalent hydrogen weight (in the following abbreviated to HAV) of 72 and a Gardner color number of 3 to 4. The pot time (corresponding to the gelling time of 100 grams of a polyglycidyl ether based on bisphenol A and epichlorohydrin, mixed with an equivalent epoxy weight of 190 and 38 grams of cross-linking agent) was 17 minutes at 22° C. The condensation product 1 consists mainly of a mixture of compounds which may be represented by the following general formula:

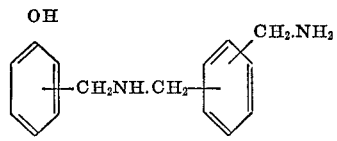

The following two examples show the improvement which can be achieved by using Paraform instead of the said aqueous formaldehyde solution.

Example 2

136 grams of a mixture of 70% by weight 1,3- and 30% by weight 1,4-bis(aminomethyl)-benzene and 25 grams water were heated in the apparatus described in Example 1 to 40–50° C. and mixed under the same conditions during 45 minutes with 22.2 grams (0.7 mole) of Paraform (containing 95% by weight formaldehyde). This method yields a finely distributed whitish precipitate. 94 grams of liquefied phenol are added. The further treatment is as in Example 1 and the same reaction products are obtained.

Example 3

The method is the same as in Example 1, but the aqueous solution of formaldehyde is replaced by a suspension of 22.2 grams of Paraform (containing 95% by weight formaldehyde) in 25 grams of water. The distribution of the whitish precipitate forming in this case is even finer than that according to Example 2. 94 grams of liquefied phenol are added. The further treatment is as in Example 1 and the same reaction products are obtained.

Example 4

According to the data of Examples 1 and 3, 142 grams (1 mole) 70% by weight 1,3- and 30% by weight 1,4-bis(aminomethyl)-cyclohexane, a suspension of 19 grams of Paraform (containing 95% by weight formaldehyde) (0.6 mole) in 25 grams water and 94 grams (1 mole) of phenol are successively brought to reaction. A low viscosity reaction product is obtained, having a viscosity of 2970 cp. (25° C.), an HAV of 72.5 and a Gardner color number of 4. The pot time (100 grams of a polyglycidyl ether based on bisphenol A and epichlorohydrin mixed with an equivalent epoxy weight of 190 and 38 grams of the cross-linking agent) was 18 minutes at 22° C.

The condensation product No. 4 consists mainly of a mixture of compounds which may be represented by the following general formula:

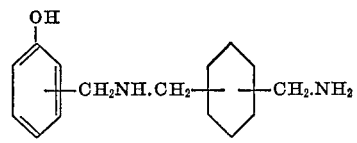

Example 5

Following the data of Example 1, 158 grams (1 mole) of a mixture of 2,2,4- and 2,4,4-trimethylhexamethylenediamine are reacted with 55 grams (0.8 mole) of a 44% by weight, aqueous formaldehyde solution and 95 grams (1 mole) of phenol.

The cross-linking agent has an HAV of 79.5, a viscosity of 1975 cp. measured with a Höppler viscosimeter at 25° C. and a pot time (100 grams of a polyglycidyl ether based on bisphenol A and epichlorohydrin mixed with an equivalent epoxy weight of 190 and 42 grams of the cross-linking agent) of 28 minutes at 22° C.

The condensation product consists mainly of a mixture of compounds having the following general formulae:

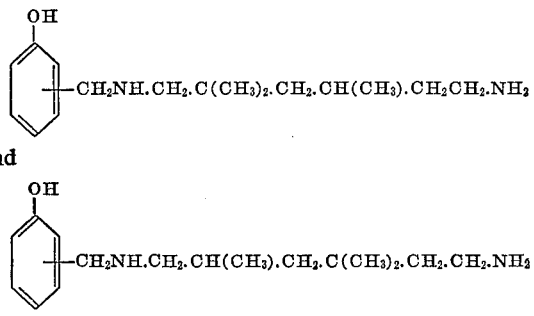

Example 6

78 grams (0.5 mole) of a mixture of 2,2,4- and 2,4,4-trimethylhexamethylenediamine, 71 grams (0.5 mole) of a mixture of 1,3 and 1,4 bis(aminomethyl-)cyclohexane and 25 grams of water are heated to 40–50° C. in an apparatus as described in Example 1, and mixed in portions under strong agitation and occasional cooling with 22.2 grams (0.7 mole of Paraform (containing 95% by weight formaldehyde). Finely distributed, whitish precipitates are formed. Stirring is continued for 15 to 45 minutes at the same temperature. Then, 94 grams (1 mole) of phenol, liquefied by heating, is added during a period of about 15 minutes. The mixture is stirred for about 30 minutes and then water is distilled off at a reduced pressure of 15–20 mm. Hg and gradual heating to 105° C. The reduced pressure is maintained for another 60 minutes, causing the whitish precipitate to be almost completely dissolved. After filtering and cooling, a slightly yellowish, low viscosity condensation product is obtained. The hardening agent has an HAV of 76, a viscosity of 2455 cp. (measured in a Höppler viscosimeter at 25° C.), an amino-number of 440 and a pot time (100 grams of a polyglycidyl ether based on bis-phenol A and epichlorohydrin mixed with an equivalent epoxy weight of 190 and 40 grams of the cross-linking agent) of 15 minutes at 22° C.

Condensation product No. 6 consists of a mixture of compounds having the following general formulae:

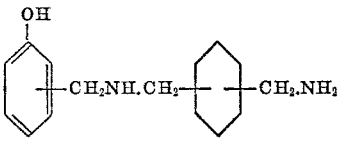

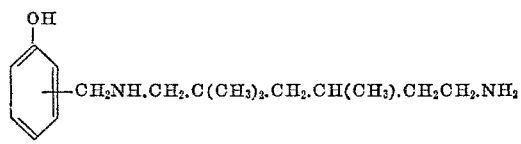

and

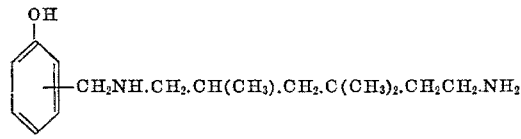

Example 7

142 grams (1 mole) of 1,4-bis-(aminoethyl)-cyclohexane, 47.9 grams (0.7 mole) of an aqueous, 44% by weight solution of formaldehyde and 94 grams (1 mole) of phenol are reacted to form a condensation product as described in Example 1.

The cross-linking agent has an HAV of 74, a viscosity of 11,554 cp. (measured in a Höppler viscosimeter at 25° C., an amino-index of 446 and a pot time (100 grams of a polyglycidyl ether based on bisphenol A and epichlorohydrin mixed with an equivalent epoxy weight of 190 and 39 grams of the cross-linking agent) of 7.5 minutes measured at 22° C.

The condensation product No. 7 consists mainly of a compound with the formula:

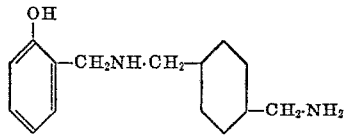

Example 8

142 grams (1 mole) of a mixture of 70% by weight 1,3 and 30% by weight 1,4-bis-(aminomethyl)-cyclohexane and 25 grams of water are heated to 40-50° C. in an apparatus as described in Example 1, and mixed in portions under strong agitation and occasional cooling with 31.5 grams (1 mole) Paraform (containing 95 w./w. formaldehyde). Finely distributed, whitish precipitate are formed. Stirring is continued for 15-45 minutes at the same temperature, and then 94 grams (1 mole) of phenol, liquefied by heating, are added. Stirring is continued for about 30 minutes. Then, water and residual phenol are distilled off under reduced pressure of about 15 to 20 mm. Hg and gradual heating to 105° C. The last phenol residues are removed by a short water vapor distillation at 150° C. and under a full vacuum, adding in drops 25 grams of water.

The condensation product No. 8 consists mainly of a mixture of compounds which may be represented by the following formula:

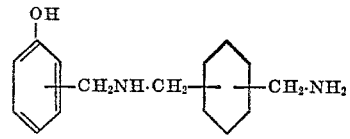

The condensation product is dissolved to 35 percent by weight in 4,4'-diamino-3,3'-dimethyl cyclohexyl methane. The cross-linking agent has an HAV of 70, a Höppler viscosity of 3640 cp., an amino-index of 449 and a pot time (100 grams of a polyglycidyl ether based on bisphenol A and epichlorohydrin mixed with an equivalent epoxy weight of 190 and 37 grams of the cross-linking agent) of 130 minutes measured at 22° C.

COMPARISON 1

94 grams (1 mole) of phenol are heated to 40-45° C. in an apparatus as described in Example 1. At this temperature, 48 grams (0.7 mole) of an aqueous, 44% by weight formaldehyde solution are added during 15 minutes. Then, 136 grams (1 mole) of a mixture of 70 percent by weight 1,3 and 30 percent by weight 1,4-bis (amino-methyl)-benzene are added at the same temperature under thorough cooling during a period of 15 to 45 minutes. No precipitate is formed. The reaction mixture is stirred for another 30 minutes at 45° C. Next, water is distilled off at reduced pressure (15-20 mm. Hg) and under gradual heating to 105° C. The reduced pressure is maintained for about 60 minutes. After filtering and cooling, a cross-linking agent is obtained, having an HAV of 73, a viscosity of 2781 cp. (measured in a Höppler viscosimeter at 25° C.), an amino-index of 490 and a pot time (100 grams of a polyglycidyl ether based on bisphenol A and epichlorohydrin mixed with an equivalent epoxy weight of 190 and 38.5 grams of the cross-linking agent) of 15 minutes at 20° C.

COMPARISON 2

146 grams (1 mole) of triethylene tetramine are heated in an apparatus as described in Example 1 to 40° C. 80 grams (1 mole) of a 37% by weight aqueous formaldehyde solution are added at the same temperature during 45 minutes under occasional cooling. Then, 94 grams (1 mole) of phenol, liquefied by heating, are added and the mixture is stirred for about 30 minutes at 40-45° C. Next, water is distilled off at reduced pressure of about 15-20 mm. Hg and gradual heating to 90° C., and the reduced pressure is maintained for about 60 minutes. After filtering and cooling, a cross-linking agent is obtained, having a viscosity of 3280 cp. (measured in a Höppler viscosimeter at 25° C.), and a pot time (100 grams of a polyglycidyl ether based on bisphenol A and epichlorohydrin, mixed with an epoxy equivalent weight of 190 and 26 grams of the cross-linking agent) of 14 minutes at 20° C.

Improvements achieved by the invention

Homogeneous mixtures are made from 190 grams of a polyglycidyl ether based on bisphenol A and epichlorohydrin with an equivalent epoxy weight of 190 and the HAV of the cross-linking agents of Examples 1 to 8 and Comparison Tests 1 and 2 are added in the corresponding gram amounts. These mixtures were used to produce coatings of 100μ thickness on glass plates and were allowed to cross-link for 24 hours at room temperature. When these cross-linked coatings were dipped into water at room temperature, the coatings made with the cross-linking agents according to the invention, as in Examples 1 to 8, showed no traces of the effects of water even after prolonged submersion, while the surface of coatings, made with the crosslinking agents of Comparison Tests 1 and 2, formed immediately a whitish layer and became soft.

Above all, the epoxy resin compounds made with the cross-linking agents according to the invention, showed, in the cross-linked state, an extraordinary resistance to organic acids and are therefore particularly suitable for coatings or linings used in agriculture, in the dairy industry or in the chemical industries, where protection against organic acids in an aqueous medium is required.

Homogeneous mixtures were made from 190 grams of a polyglycidyl ether based on bisphenol A and epichlorohydrin with an epoxy equivalent weight of 190 and amounts corresponding to the HAV's of the Examples 1 to 8 of the invention and Comparison Tests 1 and 2, and 45% by weight, related to the total mixture, of a filler mixture consisting of 93% by weight barite and 7% by weight powdered mica. From these mixtures, coatings with a thickness of about 750μ were made on glass plates and allowed to cross-link at room temperature for 24 hours. Then, these coatings were placed in 5% by weight and 10% by weight aqueous acetic acid and lactic acid solutions and continuously observed.

(1) 5% by weight acetic or lactic acid solution: The coatings made with epoxy resins, containing cross-linking agents according to the invention, remained undamaged for more than 3 months, while the coatings of Comparison Tests 1 and 2 were destroyed after 1 month.

(2) 10% by weight acetic and lactic acid solutions: Coatings made from epoxy resins and cross-linking agents according to Examples 1 to 8 remained undamaged in these solutions for 2–2½ months, whilst coatings made according to the Comparison Tests 1 and 2 were destroyed already after a fortnight.

Also the mechanical properties of epoxy castings made with the cross-linking agents according to Examples 1 to 7 were excellent. More particularly, they exhibit a very high degree of impact toughness, compared with epoxy resin castings made with components according to the Comparison Tests. In addition, specimens cross-linked according to the invention also had better bending strength and ball hardness values.

Homogeneous mixtures were made from 190 grams of a polyglycidyl ether based on bisphenol A and epichlorohydrin with an epoxy equivalent of 190 and the HAV's of the cross-linking agents according to Examples 1 to 7 and of the Comparison Tests 1 and 2; these compounds were de-aired and cast to plates having a thickness of 10 mm. After 24 hours' cross-linking at room temperature, the plates were tempered for 2 hours at 100° C. After cooling, the plates were cut into test bars and these were subjected to mechanical tests.

Cross-linking agents according to:

ether based on bisphenol A and epichlorohydrin and 20% by weight dibutyl phthalate, and 30 grams of the condensation product according to Example 1. The pot time was 20 minutes at 20° C. Owing to the low viscosity of this mixture, a high proportion of fillers may be incorporated into the system. Nevertheless, self-flowing coatings may be produced, having high lustre and good resistance to chemicals, as well as good elasticity.

Example 10

A homogeneous mixture was prepared from a low viscosity epoxy resin with an epoxy equivalent weight of 190 and a viscosity of 6000 cp. (at 25° C.) consisting of 95% by weight of a polyglycidyl ether based on bisphenol A and epichlorohydrin and 5% by weight phenylglycidyl ether, and 38 grams of the condensation product according to Example 4. The pot time was 18 minutes at 20° C. The uses and properties of this system correspond substantially to the data given in Example 9. However, in this case, the reduction of the viscosity and increase in the elasticity was achieved by adding a reactive thinner (phenylglycidyl ether) which is included into the cross-linking process and cannot, therefore, lead to exudation.

In addition, these coatings are characterized by a comparatively color-proof surface, which is lustrous and hard-drying even at a high air moisture. They may also be applied and hardened under water. They also harden at temperatures about 0° C. and exhibit a good resistance to solvents.

The main applications for these coatings are acid and solvent-proof linings for containers and swimming pools, self-flowing flooring compounds, wear resistant compounds for mortars and wall liners, coatings for steel structures above and below water, coatings for ships' decks and road markings.

| | Example | | | | | | | Comparison tests | |
|---|---|---|---|---|---|---|---|---|---|
| | 1 | 2 | 3 | 4 | 5 | 6 | 7 | 1 | 2 |
| Bending strength (kg./cm.²) | 2,300 | 2,350 | 2,300 | 2,400 | 2,500 | 2,300 | 2,350 | 1,800 | 1,900 |
| Bending to fraction (cm.) | 1.5 | 1.6 | 1.4 | 1.5 | 1.6 | 1.4 | 1.5 | 1.1 | 1.1 |
| Modulus of elasticity (kg./cm.²) | 25,000 | 24,000 | 25,000 | 24,000 | 26,000 | 25,000 | 24,000 | 28,000 | 30,000 |
| Impact toughness (cm. kg./cm.²) | 31 | 35 | 32 | 37 | 40 | 38 | 36 | 18 | 20 |
| Ball hardness (kg./cm.²) | 1,700 | 1,800 | 1,650 | 1,700 | 1,800 | 1,650 | 1,700 | 1,500 | 1,400 |

For example, the cross-linking of the condensation product No. 1 with polyglycidyl ether of bisphenol A yields synthetic resins having substantially the following structures:

Example 11

284 grams of 1,4 bis-(aminomethyl)-cyclohexane, a suspension of 44.5 grams of Paraform (95% by weight) in 50 grams of water and 440 grams of commercial nonyl

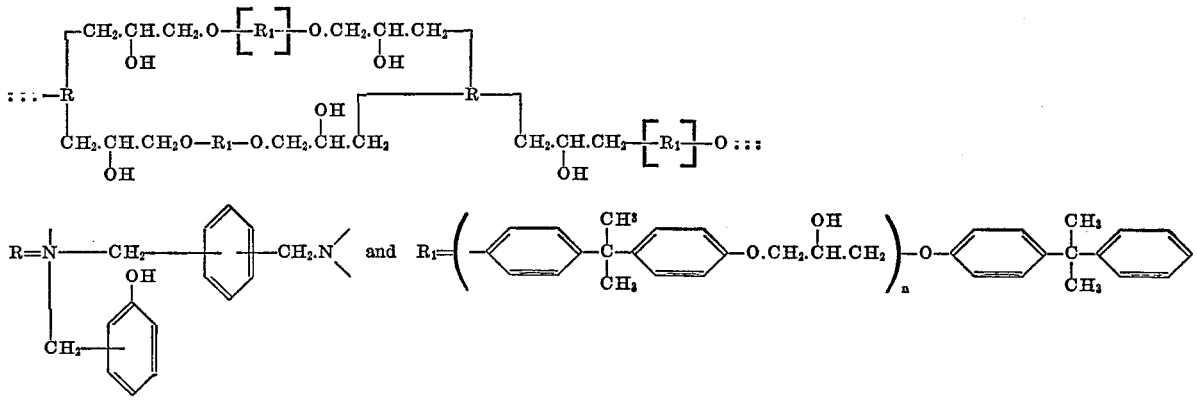

Similar cross-linking products were obtained with the condensation products according to the other examples, R being always the relevant nitrogen radical.

Example 9

A homogeneous mixture was prepared from 100 grams of a low viscosity epoxy resin with an epoxy equivalent weight of 240 and a viscosity of 1400 cp. (measured at 25° C.), consisting of 80% by weight of a polyglycidyl phenol are reacted to form a condensation product according to the data given in Examples 1 and 3.

The cross-linking agent has an HAV of 63.5, a viscosity of 1480 cp., measured in a Höppler viscosimeter at 25° C., an amino-index of 364 and a pot time (100 grams of a polyglycidyl ether based on bisphenol A and epichlorohydrin mixed with an epoxy equivalent of 190 and 33.5 grams of the cross-linking agent) of 36 minutes at 23° C.

The condensation product No. 11 consists mainly of the following compound:

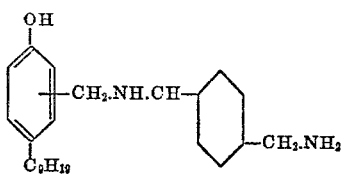

Example 12

544 grams of a mixture of 70% by weight 1,3 and 30% by weight 1,4-bis-(aminomethyl)-benzene, a suspension of 88.5 grams Paraform (95% by weight) in 100 grams of $H_2O$ and 432 grams of p-cresol are reacted to form a condensation product in accordance with the data given in Examples 1 and 3.

The cross-linking agent has an HAV of 76.5, a viscosity of 2540 cp. (measured in a Höppler viscosimeter at 25° C., an amino-index of 447 and a pot time (100 grams of a polyglycidyl ether based on bisphenol A and epichlorohydrin with an epoxy equivalent of about 190 and 40 grams of the cross-linking agent) of 14 minutes at 22° C.

The condensation product consists mainly of the following compound:

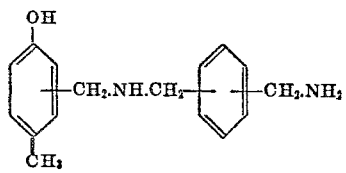

I claim:
1. A substituted phenol having the general formula

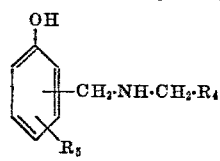

wherein

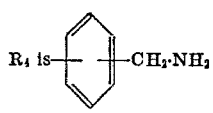

2. Substituted phenol according to claim 1 having the formula

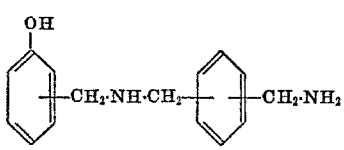

3. Substituted phenol according to claim 1 having the formula

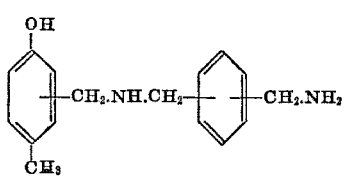

References Cited
UNITED STATES PATENTS

| | | | |
|---|---|---|---|
| 3,539,633 | 11/1970 | Piasek et al. | 260—570.5 |
| 2,353,192 | 7/1944 | Sargent et al. | 260—570 UX |
| 2,459,112 | 1/1949 | Oberright | 260—570.5 UX |
| 3,458,495 | 7/1969 | Younghouse et al. | 260—570.5 X |
| 2,653,977 | 9/1953 | Craig et al. | 260—570.5 |

ROBERT V. HINES, Primary Examiner

U.S. Cl. X.R.

117—116 (ZB); 260—28, 47 (EN), 55, 570 (R), 570.8 (R) 570.9, 583 (P)